Sept. 20, 1960 F. G. CLARK 2,952,913
HOLD-DOWN DEVICE FOR PATTERN CUTTING MACHINES
Filed May 6, 1959 2 Sheets-Sheet 1

INVENTOR
Frederick G. Clark
BY
ATTORNEYS

Sept. 20, 1960      F. G. CLARK      2,952,913
HOLD-DOWN DEVICE FOR PATTERN CUTTING MACHINES
Filed May 6, 1959      2 Sheets-Sheet 2
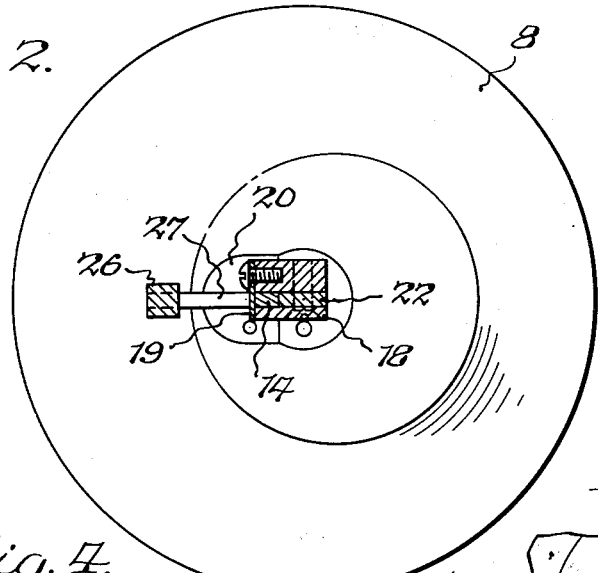
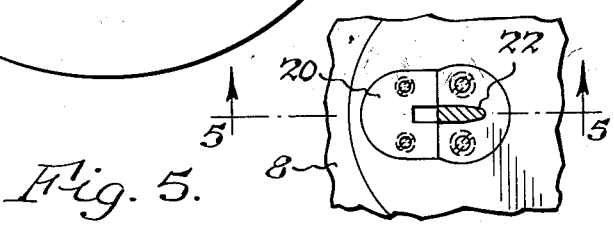
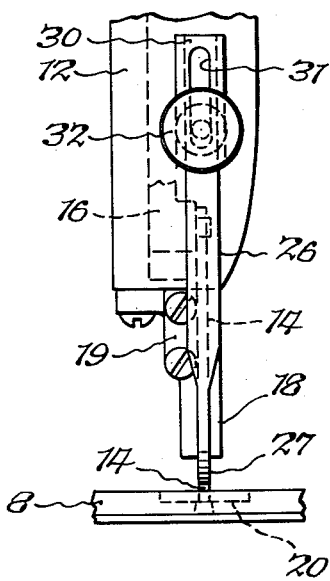
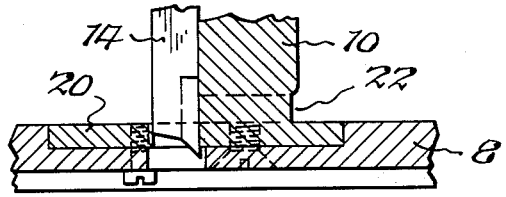
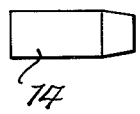
INVENTOR
Frederick G. Clark,
BY
ATTORNEYS

2,952,913
HOLD-DOWN DEVICE FOR PATTERN CUTTING MACHINES

Frederick G. Clark, Buffalo, N.Y., assignor to Eastman Machine Company, Buffalo, N.Y.

Filed May 6, 1959, Ser. No. 811,441

2 Claims. (Cl. 30—275)

This invention relates to machines for cutting relatively rigid sheet material such, for example, as is used in making patterns prepared for the cutting of garment fabrics. Such materials are difficult to cut with scissors, and it is consequently desirable to employ a machine for cutting these materials which makes a groove-like cut in the material and in which the machine is advanced along the groove-like cut. Machines of this type employ a vertically reciprocatory knife which cuts out bits of this material as it advances in the groove which it has cut, and this knife tends to lift the material during its upward stroke, due to adhesion of the material to the reciprocatory cutter.

It is consequently an object of this invention to provide a hold-down mechanism of improved construction which is adjustably mounted on the machine for cooperation with material of varying thicknesses.

It is also an object of this invention to provide a hold-down mechanism of this type which is of a width not materially greater than the width of the knife making the cut so that this hold-down mechanism may be used in following lines of a pattern on the sheet material.

In the accompanying drawings:

Fig. 2 is a sectional plan view thereof on line 2—2, Fig. 1.

Fig. 3 is a fragmentary plan view thereof on line 3—3, Fig. 1.

Fig. 4 is a fragmentary front elevation of the machine shown in Fig. 1.

Fig. 5 is a sectional elevation thereof on an enlarged scale on line 5—5, Fig. 3.

Fig. 6 is an enlarged bottom plan view of the reciprocatory cutting member.

Figure 1:
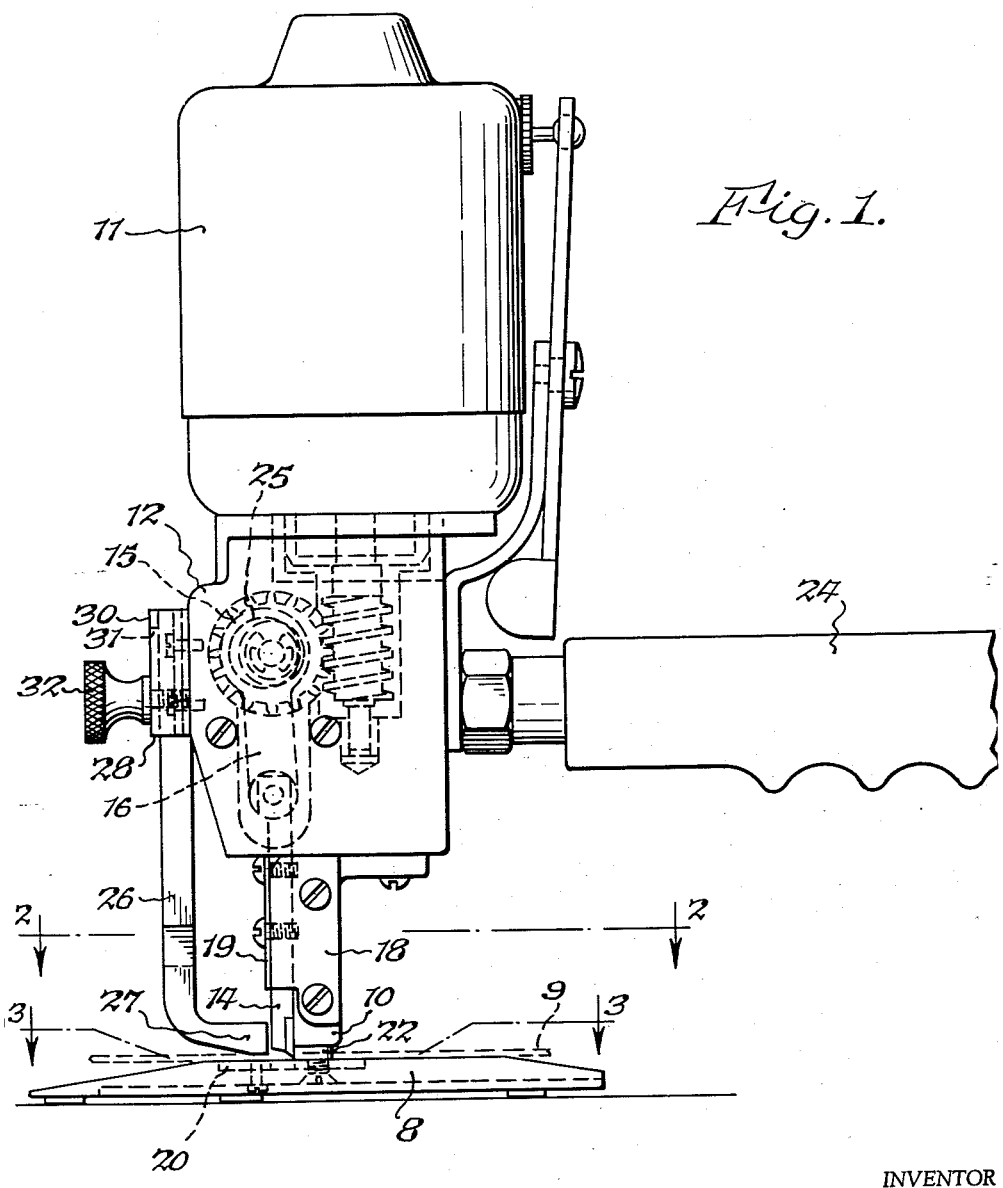
Fig. 1 is a side elevation of a cutting machine provided with a hold-down device embodying this invention.

My improved hold-down and guide member may be employed in connection with cutting machines of various different types and for the purpose of illustrating the use of my improvements, I have shown the same applied to one particular type of cutting machine merely for the purpose of illustrating my invention, it being understood however that my improvements may be used on cutting machines of other types.

The machine shown in the drawing includes a comparatively flat base 8 which moves on a suitable platform or table underneath the material to be cut, this material being indicated in the broken lines 9 of Fig. 1. The machine includes an upright standard 10 rigidly secured to the base and extending upwardly therefrom and supporting a motor 11 and a suitable transmission mechanism arranged within a housing 12 for converting the rotary motion of the motor shaft into reciprocatory motion and transmitting it to a vertical reciprocatory cutting member 14. The transmission mechanism may be of any suitable or desired type such for example as indicated in broken lines in Fig. 1 and includes a worm gear 15 driven from the motor, and an eccentric 25 on the shaft of the worm gear and which actuates a connecting rod 16 connected with the upper end of the cutting member 14. The cutting member 14 is slidably arranged on the front face of the standard 10 and is held in place on the front face of the standard by any suitable guide plates 18 and 19. The lower end of the cutting member cooperates with a shear plate or die 20 recessed in the upper face of the base 8. The lower portion of the standard 10 has a neck 22 which is of a width not greater than the width of the cutting member 14 so that this part of the standard can move along in the groove formed by the cutting member. The machine also includes a handle 24 rigidly secured to the housing 12 for guiding the machine in its movement along the material to be cut.

In the operation of the machine thus far described, the cutting member acts as a punch to cut from the material small parts or pieces at a time, and as a cut is made the machine can be advanced along the groove cut by the cutting member but no further than the longitudinal dimension of the knife since the reduced part or neck 22 of the standard will come into contact with the end of the groove which limits the advance of the machine between cuts and assures a continuous groove or cut.

When the cutting machine moves forwardly after having made a cut in the material, the material tends to adhere to the cutting member while it moves upwardly and the material will consequently be lifted above the base 8, thus interfering with the correct cutting of the material. For this purpose I have provided a hold-down and guide member which has a part arranged immediately in advance of the cutting member and in close proximity to the upper surface of the material to be cut. The lower part of this hold-down member is preferably of a width not materially in excess of the cutting member so that it will not interfere with a clear view of the line on the pattern which is to be followed by the cutting member of the pattern cutter. In the particular construction shown for this purpose, I have provided a hold-down member in the form of a rod or bar 26 suitably mounted on the housing 12 and having a lower part 27 bent rearwardly at an angle from the upright portion of the bar 26 and extending into close proximity to the front edge of the cutting member. This hold-down member may be approximately square in cross section at the upper portion thereof and the lower part is of reduced width, preferably not materially wider than the width of the cutting member. During the operation of the machine, the operator watches the lower end of the hold-down member and guides the machine so that the hold-down member will follow any line of the pattern on the material which is being cut.

The material which is being cut may vary in thickness, and consequently it is desirable to mount the hold-down member in such a manner that it may be adjusted to accommodate it to material of different thicknesses. Any suitable or desired means may be employed for mounting the hold-down member in this manner, and in the construction shown the front face of the housing 12 has a flat portion to which a suitable guide member 28 for the upper end of the hold-down member may be secured. This guide member is provided with a front plate 30 having a slot 31, see particularly Fig. 4, and a set screw 32 is provided which has a threaded end formed to engage a threaded hole in the upper portion of the hold-down member. This threaded portion of the set screw extends through the slot 31 and when the hold-down member is set at the desired elevation, the set screw is tightened and will clamp the upper end of the hold-down member against the front plate 30, thus holding this member in the desired position in which it prevents lifting the material during the upward motion of the cutting member.

It will be understood that various changes in the details, materials and arrangements of parts, which have been herein described and illustrated in order to explain the nature of the invention, may be made by those skilled in the art, within the principle and scope of the invention, as expressed in the appended claims.

I claim:

1. In a machine for cutting a linear groove in a relatively rigid sheet of material, said machine including a vertically reciprocatory cutting member having its lower end formed to penetrate the material, a base formed to pass under the material and having a die with which said cutting member operates, a motor, mechanism for imparting reciprocation to said cutting member, a standard extending upwardly from said base and supporting said motor and mechanism and having a neck formed to pass through the cut formed by said knife, means on said standard for guiding said knife in its reciprocatory movement, and a hold-down and guide member of rigid material having its upper portion secured on said machine and having a lower non-resilient part extending downward into close proximity to the front edge of said knife and to said material for holding down the material after penetration of the same by the knife, said lower part being of a width approximately similar to the width of said knife to render said lower part useable as an indicator to follow the line along which the cut is to be made.

2. In a cutting machine according to claim 1 in which said machine includes a housing for said mechanism which has a front part extending forwardly beyond said cutting member, said hold-down member comprising a substantially upright portion and a lower rearwardly extending part, means for adjustably mounting said upright portion on said front part of said housing, the lower part of said upright portion and said rearwardly extending part thereof being of a thickness not materially greater than the thickness of said cutting member and serving as a guide to follow the line along which the cut is to be made.

References Cited in the file of this patent

UNITED STATES PATENTS

| | | |
|---|---|---|
| 699,399 | Leve | May 6, 1902 |
| 1,253,352 | Clark et al. | Jan. 15, 1918 |
| 1,462,650 | Maimen et al. | July 24, 1923 |
| 1,568,705 | Zawistowski | Jan. 5, 1926 |
| 1,940,483 | Bangser | Dec. 19, 1933 |
| 2,077,900 | Ross | Apr. 20, 1937 |
| 2,877,550 | Scuderi | Mar. 17, 1959 |